United States Patent [19]
Singh

[11] 3,946,965
[45] Mar. 30, 1976

[54] VEHICLE SENSITIVE INERTIA RETRACTOR

[75] Inventor: Harkrishan Singh, Dearborn Heights, Mich.

[73] Assignee: Ford Motor Company, Dearborn, Mich.

[22] Filed: Dec. 23, 1974

[21] Appl. No.: 535,544

[52] U.S. Cl. .................................... 242/107.4 R
[51] Int. Cl.² ...................................... B65H 75/48
[58] Field of Search ..........................................
242/107.4–107.6, 107.7; 280/150 SB; 297/385, 386, 388

[56] References Cited
UNITED STATES PATENTS

| | | | |
|---|---|---|---|
| 3,489,367 | 1/1970 | Kovacs et al. | 242/107.4 |
| 3,834,646 | 9/1974 | Heath | 242/107.7 |

*Primary Examiner*—Leonard D. Christian
*Attorney, Agent, or Firm*—John J. Roethel; Keith L. Zerschling

[57] ABSTRACT

A seat belt retractor mechanism having a belt reel rotatably mounted on a shaft journalled in a support frame, the reel at each of its ends having a circular ratchet plate. A locking bar parallels the reel shaft and is pivotally mounted in the support frame for movement into engagement with the ratchet plates to hold the reel against rotation in seat belt protraction direction. An inertia sensor comprising a pendulum device is engageable with the locking bar.

The improvement comprises a support bracket on the support frame beneath the locking bar for which the pendulum device is suspended. Coacting gimbal means on the support bracket and pendulum device permit swinging movement of the pendulum device relative to the support bracket. The locking bar and pendulum device are constructed and arranged so that during swinging movement on the gimbal means the pendulum device is ineffective to cause movement of the locking bar toward the ratchet plate. A further coacting means becomes operative on displacement of the pendulum device beyond its gimbal means controlled swinging movement whereby the pendulum device is rendered operative to raise the locking bar to drive the latter into ratchet plate holding engagement.

4 Claims, 3 Drawing Figures

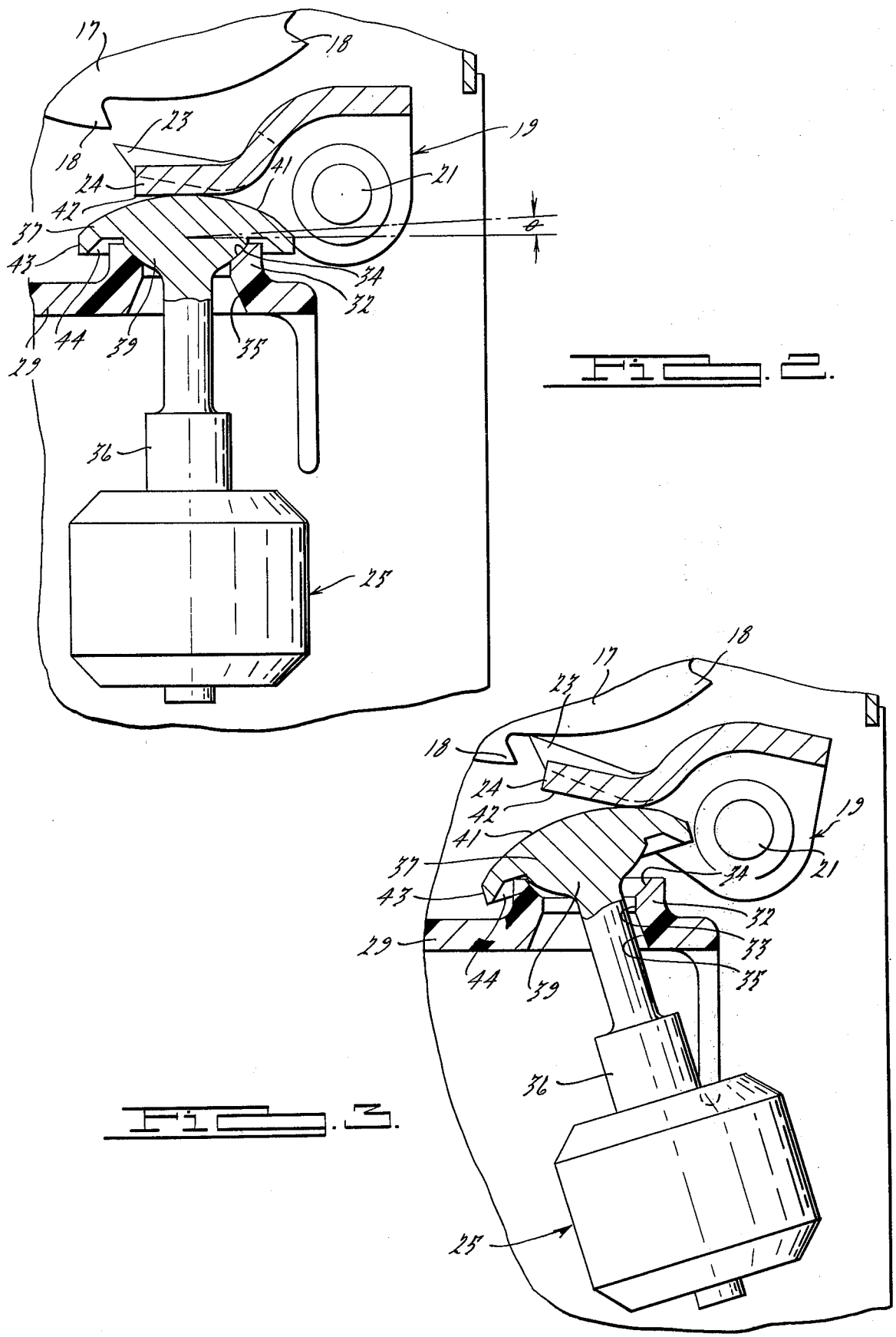

VEHICLE SENSITIVE INERTIA RETRACTOR

BACKGROUND OF THE INVENTION

Currently, most vehicles are equipped with passenger restraint systems having a lap belt and shoulder harness. Preferably, the shoulder harness is coupled to a vehicle sensitive retractor mechanism. This is a retractor mechanism in which the spring loaded reel under normal conditions of operation is freely movable in protraction and retraction directions. This is to give the restrained vehicle occupant a high degree of freedom of movement. The mechanism includes, however, an inertia sensitive device, usually in the form of a pendulum, which is responsive to sudden changes in vehicle movement such as may be caused by a sudden application of the vehicle brakes or upon impact with an object such as another vehicle. The shift in position of the pendulum or part thereof is transmitted to a locking bar engageable with the reel to lock the latter against movement in a protraction direction. Reference may be made to U.S. Pat. No. 3,489,367, issued Jan. 13, 1970 to R. F. Kovacs et al for an "Emergency Locking Retractor."

Vehicle sensitive retractors utilizing a pendulum swingable about a single universal pivot have been found to have undesirable operating characteristics. For example, it is important that the retractor be installed in the vehicle with the pendulum vertical axis normal to ground level. Variations in vehicle body structures sometimes makes it difficult to achieve this and it is therefore necessary to make adjustments which slow down the vehicle assembly process. Further, if the vehicle is parked on a slope, it is possible that the harness cannot be protracted to permit the seat occupant to buckle up.

It is an object of the present invention to support the pendulum in such a manner that it can be tilted within a predetermined range without causing the locking bar to engage and hold the reel against protraction. Upon being tilted beyond a predetermined position, however, the pendulum becomes operative to raise the locking bar into reel engagement.

SUMMARY OF THE INVENTION

The present invention relates to a seat belt retractor mechanism having a belt reel rotatably mounted on a shaft journalled in a support frame, the reel having at each of its ends a circular ratchet plate. A locking bar paralleling the reel shaft is pivotally mounted in the support frame for movement into engagement with the ratchet plate to hold the reel against rotation in seat belt protraction direction. An inertia sensor comprising a pendulum device engageable with the locking bar is provided that is operative to drive the locking bar into engagement with the reel upon sudden deceleration or acceleration of the vehicle.

The improved construction and arrangement embodying the present invention comprises a support bracket on the support frame beneath the locking bar from which the pendulum is suspended. Coacting gimbal means on the support bracket and pendulum device permit swinging movement of the pendulum device relative to the support bracket. The locking bar and pendulum device are constructed and arranged so that during swinging movement on the gimbal means a pendulum device is ineffective to cause movement of the locking bar toward the ratchet plates. A further coacting means becomes operative on displacement of the pendulum device beyond its gimbal means controlled swinging movement whereby the pendulum device is rendered operative to raise the locking bar into ratchet plate holding engagement.

DESCRIPTION OF THE DRAWINGS

Further features and advantages of the present invention will be made more apparent as this description proceeds, reference being had to the accompanying drawings, wherein:

FIG. 2 is a view in part sectional on the line 2—2 of FIG. 1 looking in the direction of the arrows; and FIG. 3 is a view in part similar to FIG. 2 illustrating the inertia sensor device in a second position of operation.

DETAILED DESCRIPTION OF THE INVENTION

Figure 1:
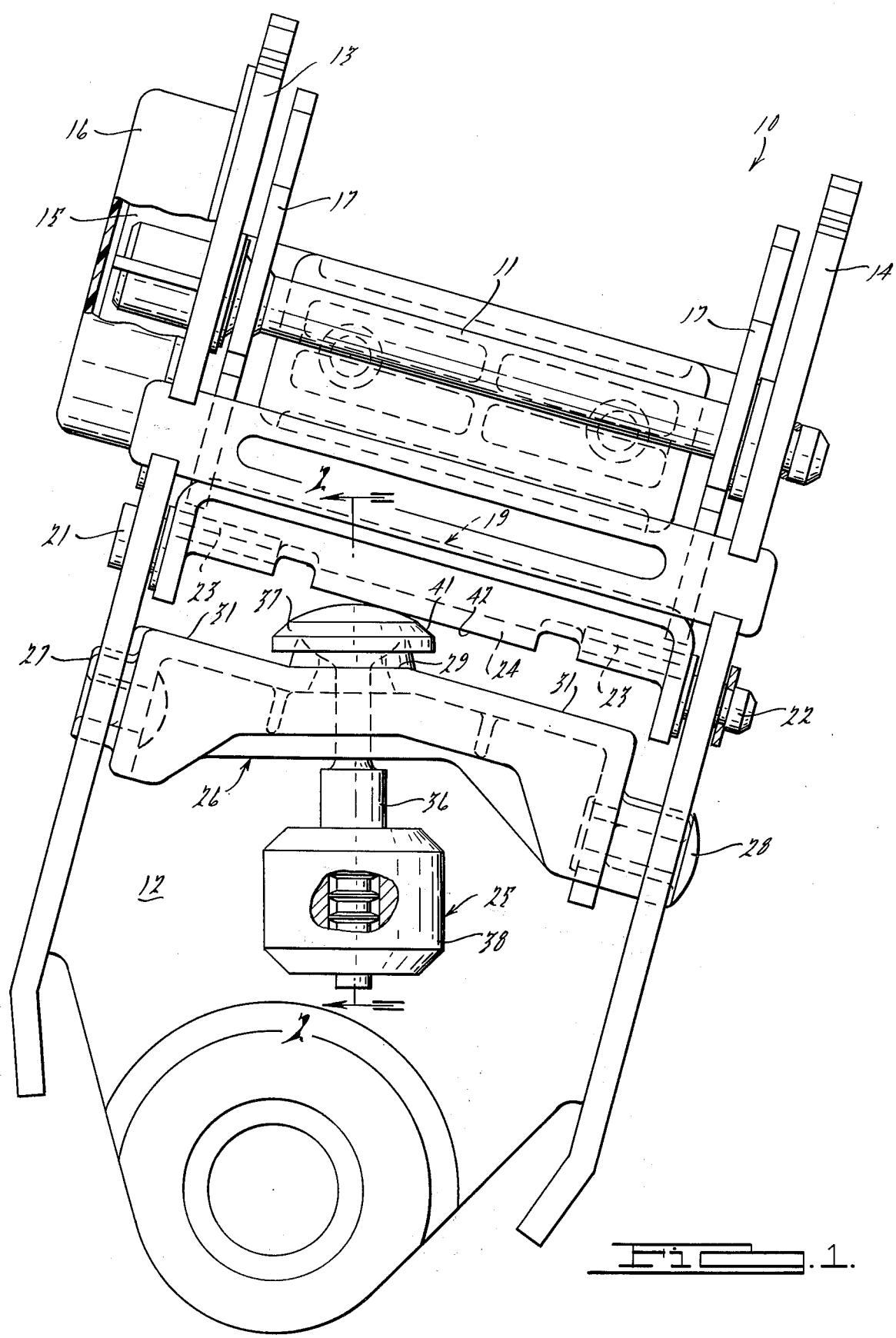
FIG. 1 is a front elevation of a seat belt retractor mechanism embodying the present invention.

Referring now to the drawings, there is shown a seat belt retractor mechanism generally designated 10. The retractor mechanism 10 comprises a belt receiving reel 11 rotatably journalled in a support frame 12 between the side walls 13 and 14 of the latter. The reel 11 is coupled externally of the side wall 13 to a rewind spring 15 concealed within a spring housing 16.

At each of its ends within the side walls 13–14, the reel 11 carries a ratchet plate 17 having peripheral ratchet teeth 18. An elongated bar 19 parallels the reel 11, the bar being pivotally supported at each of its ends on pivots 21 and 22 in the frame side walls 13–14, respectively. The bar has at each end a locking pawl 23 projecting in the general direction of the ratchet teeth on the adjacent ratchet plate (see FIG. 2). Intermediate its ends the locking bar 19 has a center platform portion 24 adapted to be engaged by an inertia sensor in the form of a pendulum device 25, as will be more fully explained.

In FIG. 1, the retractor mechanism 19 is shown at an angle to the vertical to represent it as it would appear when mounted on the roof rail of a vehicle body. The pendulum device 25 is shown hanging from a support bracket 26 in a true vertical position. In the optimum installation position, the pendulum device 25 would appear in the true vertical from all sides. Because of manufacturing tolerances permitted in the assembly of vehicle bodies, the surfaces to which the retractor mechanism are secured may vary from vehicle to vehicle. As a result, the longitudinal axis of the pendulum device 25 may deviate from the true vertical. The present invention accommodates such deviations.

The support bracket 26 is preferably molded of a low friction plastic material and has one end 27 supported on the side wall 13 and the other end 28 supported on the side wall 14 of the frame 19. Intermediate its ends and substantially centrally thereof, the support bracket 26 has a horizontal platform portion 29 which appears at an angle to the upper surfaces 31 of the support bracket 26 which are perpendicular to the frame side walls 13–14. It will be understood that if the frame 19 was adapted to be mounted with its longitudinal axis extending in a direction perpendicular to ground level, the upper surface of the support bracket 26 would be an uninterrupted planar surface normal to the frame side walls 13–14.

The platform portion 29 has an upstanding circular boss 32 which has an aperture 33 through its center. At its upper end the aperture 33 is formed as a spherical socket 34 and at its lower end the aperture is formed with a conical taper 35. In effect, the circular boss 32 with the aperture 33 therethrough forms an annular raised wall surrounding the socket 34.

The pendulum device 25 comprises a stem 36 having a cap 37 at its upper end and a pendulum mass 38 at its other or lower end. The cap 37 has a spherical segment 39 on its stemmed side or underside, the spherical segment being complementary to the socket 34 whereby the socket and spherical segment coact to form a gimbal means providing a universal pivot axis about which the pendulum device 25 is swingable. The upper surface 41 of the cap is also a spherical segment having a radius such that as the pendulum device 25 swings about the gimbal means the upper surface 41 of the cap maintains at the most tangential contact with the underside 42 of the center portion 24 of the locking bar 19. The latter is usually gravity held in its lower or nonratchet engaging position.

It will be understood that the pendulum device stem 36 projects through the aperture 33 in the platform 29 so that the pendulum mass 38 is suspended therebeneath.

On its underside between the spherical segment 39 and its outer edge 43, the cap 37 is undercut to form an annular recess 44 adapted to fit over the top of the annular wall 32 surrounding the socket 34. There is sufficient clearance between the upper surface of wall 32 and the base of the recess so that the pendulum device is permitted to tilt about the gimbal means (ball 39 and socket 34) through the extent indicated by the angle $\theta$ as indicated in FIG. 2.

The angle $\theta$ is preferably on the order of 3½°. This means that the retractor mechanism 10 may be installed with the pendulum device tilted ± 3½° from its optimum or true vertical position without causing any displacement of the locking bar 19 towards ratchet plates 17. It means further that the vehicle body may be tilted within the ± 3½° range without causing the retractor mechanism to lock up. This is because the spherical surface 41 of the cap maintains only tangential contact with the underside 42 of the locking bar 19 as long as it swings about the universal pivot axis of the gimbal means formed by the ball or spherical segment 39 and spherical socket 34. Beyond the 3½° permitted displacement, a further condition occurs as may best be seen with reference to FIG. 3.

When the pendulum device is tilted beyond the angle $\theta$, the pivot axis is shifted from the pivot axis of the ball and socket or gimbal means to a pivot axis formed by the base of the recess 44 abutting the top surface of the annular wall 32. Because of the shifting of the pivot axis the cap 37 is eccentrically tilted whereby the cap surface diametrically opposite the point abutting the top of the annular wall 32 is lifted and carries the locking bar 19 upward into ratchet plate 17 engageable position. That is, the locking bar is carried into a position in which the locking pawls 23 thereon engage the ratchet teeth 18 and hold the reel against rotation in belt protraction direction.

The annular wall 32 in the recess 44 wall coact to prevent lateral shifting of the pendulum device 25 relative to the planar surface of the platform 29 despite the fact the spherical segment or ball 39 is lifted out of its socket.

It has been determined that the compound movement of the pendulum device 25 required to cause movement of the locking bar 19 into ratchet plate engagement position has very little effect on the time element involved for the reel lock up to occur. During the initial movement of the pendulum device 25 in response to a sudden deceleration of a vehicle, the pendulum device is free to move without any resistance from the locking bar 19. The pendulum device 25 is thus able to accelerate faster than it would if it had to lift the locking bar 19 upon being moved from an at rest position. With the construction and arrangement embodied in the present invention, the extra momentum that the pendulum device 25 is able to achieve before impacting and raising the locking bar 19 causes the latter to be driven more quickly into ratchet plate engagement once it is impacted by the pendulum cap 37.

It is to be understood this invention is not limited to the exact construction illustrated and described above, but that various changes and modifications may be made without departing from the spirit and scope of the invention as defined by the following claims.

I claim:

1. A seat belt retractor mechanism having a belt reel rotatably mounted on a shaft journalled in a support frame, the reel at each of its ends having a circular ratchet plate, a locking bar paralleling the reel shaft pivotally mounted in the support frame for movement into engagement with the ratchet plates to hold the reel against rotation in seat belt protraction direction, and an inertia sensor comprising a pendulum device engageable with the locking bar to drive the latter into ratchet plate engagement, wherein the improvement comprises:

a support bracket on the support frame beneath the locking bar from which the pendulum device is suspended, the support bracket and pendulum device having coacting gimbal means providing a first universal pivot about which the pendulum device is displaceable from a vertical equilibrium position to a predetermined position in which the pendulum device maintains proximate contact with the locking bar without causing movement of the latter toward the ratchet plate, and the support bracket and the pendulum device having further coacting means operative on displacement of the pendulum device beyond a predetermined position providing a second pivot about which the pendulum device is swingable independently of the gimbal means, the pendulum device upon being swung about the second pivot having a part thereof abutting the locking bar to raise the latter into ratchet plate holding engagement.

2. A seat belt retractor mechanism having a belt reel rotatably journalled in a support frame, the reel at each of its ends having a circular ratchet plate, a locking bar pivotally mounted in the support frame parallel to the reel shaft for movement into engagement with the ratchet plate to hold the reel against rotation in seat belt protraction direction, a support bracket on the support frame having a substantially vertical aperture therethrough and a ball socket facing the locking bar at the upper end of the aperture, a pendulum comprising an elongated stem having a cap at one end and a pendulum mass at the other end, the cap having a spherical segment on the stem side thereof, the spherical segment being seated in the ball socket with the stem projecting through the support bracket aperture to suspend the pendulum mass therebelow, the pendulum cap having its upper portion in tangential proximity to the locking bar whereby, as the pendulum swings about a universal pivot formed by the ball and socket through a predetermined angle from the normal, no displacement of the locking bar toward the ratchet plate occurs, the cap of the pendulum upon the latter being swung beyond the predetermined angle being tilted independently of the ball and socket pivot about a pivot formed by a cap portion adjacent the spherical segment abutting a portion of the support bracket whereby the cap surface diametrically opposite the abutting edge will rise and abut the locking bar to move the latter into ratchet plate engagement.

3. A seat belt retractor mechanism according to claim 2, in which:

the upper portion of the pendulum cap is also a spherical segment.

4. A seat belt retractor mechanism according to claim 3, in which:

the portion of the support bracket coacting with the cap edge portion comprises an annular raised wall surrounding the socket, the cap edge portion having an annular recess in which the annular wall is seated, the wall and recess coacting to prevent lateral displacement of the pendulum when the cap lower spherical segment is lifted out of its socket.

* * * * *